(12) United States Patent
Kondo

(10) Patent No.: US 8,516,288 B2
(45) Date of Patent: Aug. 20, 2013

(54) MICROCOMPUTER

(75) Inventor: Takao Kondo, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 298 days.

(21) Appl. No.: 12/941,969

(22) Filed: Nov. 8, 2010

(65) Prior Publication Data

US 2011/0113275 A1   May 12, 2011

(30) Foreign Application Priority Data

Nov. 12, 2009   (JP) ................................ 2009-258832

(51) Int. Cl.
*G06F 1/00*   (2006.01)
*G05F 1/10*   (2006.01)

(52) U.S. Cl.
USPC ........................................ 713/324; 327/540

(58) Field of Classification Search
USPC ................ 713/324; 257/400–500, 681, 691; 326/33, 41, 62, 63, 80; 327/538, 540, 544; 361/56; 365/226–229
See application file for complete search history.

(56) References Cited

U.S. PATENT DOCUMENTS

| | | | | |
|---|---|---|---|---|
| 7,564,259 B2* | 7/2009 | Agarwal et al. | ................. | 326/33 |
| 7,593,280 B2* | 9/2009 | Kim | .............................. | 365/222 |
| 7,612,604 B2* | 11/2009 | Miyazaki et al. | ............. | 327/534 |
| 8,217,494 B2* | 7/2012 | Chen | .............................. | 257/577 |
| 2007/0206781 A1* | 9/2007 | Sasaki et al. | ................... | 379/417 |
| 2008/0173899 A1* | 7/2008 | Takakuwa et al. | ............. | 257/203 |
| 2008/0211537 A1* | 9/2008 | Tsuda | ............................. | 326/33 |

FOREIGN PATENT DOCUMENTS

JP   2008-59300 A   3/2008

OTHER PUBLICATIONS

Machine Translation of JP 2008-059300 to Renesas Technology Kabushiki Kaisha (pub date Mar. 13, 2008).*

* cited by examiner

*Primary Examiner* — Kim Huynh
*Assistant Examiner* — Austin Hicks
(74) *Attorney, Agent, or Firm* — Foley & Lardner LLP

(57) ABSTRACT

IO buffers that operate with an IO power supply system and cut cells that isolate the IO buffers from each other are disposed on the periphery of an always-on power supply area and a power supply cut-off available area. A signal indicating the holding of an IO output(s) output from the always-on power supply area is wired so as to go round the IO buffers and the cut cells. The cut cell includes a level shifter that operates with an IO power supply system. The cut cell shifts the level of signal indicating the holding of IO output so that the signal level conforms to the power supply system of IO buffers, and outputs the resultant signal to the IO buffers.

9 Claims, 11 Drawing Sheets

| AREA | IOHOLD0 | DMHLD (VALUE OF REGISTER 200) | OPERATION OF IO BUFFER 110 |
|---|---|---|---|
| 1 | 1 | 1 | DO NOT HOLD IO OUTPUT |
| | | 0 | HOLD IO OUTPUT |
| 2 | 1 | 1 | DO NOT HOLD IO OUTPUT |
| | | 0 | HOLD IO OUTPUT |

MICROCOMPUTER

INCORPORATION BY REFERENCE

This application is based upon and claims the benefit of priority from Japanese patent application No. 2009-258832, filed on Nov. 12, 2009, the disclosure of which is incorporated herein in its entirety by reference.

BACKGROUND

1. Field of the Invention

The present invention relates to a microcomputer, in particular, a microcomputer having a power saving function.

2. Description of Related Art

A standby mode (power saving mode) is adopted in microcomputers. In the standby mode, various measures such as a reduction in the clock frequency of the CPU, a reduction in the power supply voltage, a suspension of the clock supply to the CPU, and/or a suspension of the power supply to the CPU are performed.

Japanese Unexamined Patent Application Publication No. 2008-59300 discloses a microcomputer to achieve the reduction in the power consumption. FIG. 9 shows a configuration of this microcomputer. This microcomputer 300 has, in addition to the normal operation mode, a deep standby mode where an internal power supply 1 is cut off and the clock of a CPU 310 is suspended.

Under instructions from a power control unit 340, a power supply circuit 330 generates two types of internal power supplies by lowering the voltage of the electric power supplied from the outside of the LSI, and supplies the generated internal power supplies into the LSI. The internal power supply 1 is cut off during the deep standby mode. An internal power supply 2 is supplied even in the deep standby mode. IO buffers 320a and 320b output internal signals of the LSI to the outside of the LSI, and supply input signals supplied from the outside of the LSI into the LSI. The IO buffers 320a and 320b are divided into a plurality of groups, and their terminal states during a deep standby mode and immediately after a recovery from the deep standby mode can be controlled on a group-by-group basis. As for the terminal states in the IO buffers 320a and 320b during the deep standby mode, when it is "terminal is to be held", they hold the states immediately before the deep standby mode (inputs/outputs, output values), whereas when it is "terminal is not to be held", they become high-impedance (HiZ) states. As for the terminal states in the IO buffers 320a and 320b at the recovery from the deep standby mode, when it is "terminal is to be held", they hold the terminal states until a certain operation is performed, whereas when it is "terminal is not to be held", they change to the reset states. Since the internal power supply 1 is cut off during the deep standby mode, the leak current can be reduced.

Data latches (LATs) 321 are provided within the IO buffer 320. FIG. 10 shows a configuration diagram of the IO buffer 320. The data latches 321 hold an IO output state until the recovery from the deep standby mode. In this way, when the LSI is recovered from the deep standby mode, it is possible to carry out a booting process and a series of subsequent processes by using information held by the data latches 321. Voltage-boosting circuits 322 and voltage-lowering circuits 323 are circuits that are used to convert the voltage level of signals.

SUMMARY

However, the present inventors have found the following problem. Japanese Unexamined Patent Application Publication No. 2008-59300 does not have any detailed description about the power supply to the level shifters (voltage-boosting circuits 322 and voltage-lowering circuits 323).

To make it possible to understand the circuit operation directly from FIG. 10, assume that the level shifters (voltage-boosting circuits 322 and voltage-lowering circuits 323) are supplied with electric power from the internal power supply 1. In this case, since the voltage-boosting circuits 322 are suspended, the signals supplied to the LATs 321 become unknown states. Therefore, the holding operation of the IO output cannot be ensured during the deep standby mode. Even if the level shifters are supplied with electric power from another power supply that is always in an On-state (internal power supply 2), the following problem occurs. FIG. 11 is a conceptual diagram showing a configuration of a microcomputer in which the level sifters (L/S) are supplied with electric power from a power supply that is always in an On-state (internal power supply 2). Detailed explanation is made hereinafter with reference to FIG. 11.

In FIG. 11, an always-on power supply area 401 and power supply cut-off available areas 402 and 403 are provided in an LSI 400. Further, in order to supply electric power to IO buffers 405 at all times even in a deep standby mode, it is necessary to supply the electric power to each of the IO buffers 405 from the always-on power supply area 401 where the power supply is not cut off. As a result, as shown in FIG. 11, it is necessary to dispose the always-on power supply area 401 in such a manner that it surrounds the power supply cut-off available areas 402 and 403 so that electric power can be supplied to level shifters 406 located within the IO buffers.

Though depending on the chip size and/or the way of dividing the power supply area, it is desirable, in general, to form the always-on power supply area 401 with as small circuits as possible in order to reduce the power consumption. By forming this always-on power supply area 401 with the minimum circuits, it is expected that its area ratio occupying the internal area of the chip decreases. Further, it is desirable to lower the power supply capability necessary for the always-on power supply area 401 as much as possible. However, when the always-on power supply area 401 is disposed so as to surround the power supply cut-off available areas 402 and 403 as shown in FIG. 11, the area of the always-on power supply area 401 increases. Further, in this case, as the always-on power supply area 401 becomes larger, a voltage drop of the IR product that occurs on the power supply lines (IR drop) could occur. Because of the possibility of the occurrence of the IR drop, the designing of the chip becomes very difficult.

A first exemplary aspect of the present invention is a microcomputer including: a plurality of IO buffers that operate with an IO power supply system, the plurality of IO buffers being disposed on a periphery of an always-on power supply area and a power supply cut-off available area; at least one cut cell that operates with the IO power supply system, the at least one cut cell being disposed so as to isolate the IO buffers from each other; a standby control unit that outputs an IO output hold signal used to instruct the IO buffers whether or not the IO buffers should hold an IO output value of the power supply cut-off available area during a power saving mode, a power supply being cut off in the power supply cut-off available area during the power saving mode; and at least one line wired so as to go round the IO buffers and the cut cell, the at least one line being also connected to the standby control unit, wherein the standby control unit outputs the output hold signal to the line, the cut cell includes a level shifter that operates with the IO power supply system, retrieves the IO output hold signal from the line corresponding to an adjacent power supply cut-off available area, shifts a level of the IO output hold signal to a level of a power supply system with which an adjacent IO buffer operates, and supplies the signal whose level is shifted to the adjacent IO buffer as a latch enabling signal used to instruct whether or not an IO output value should be held, and the IO buffer holds an IO output state of the adjacent power supply cut-off available area based on the latch enabling signal.

In an exemplary aspect of the present invention, an IO output hold signal is supplied so as to go round the IO buffer groups disposed on the periphery of the power supply cut-off available area before the microcomputer enters a standby mode. Since the IO buffers operate with the IO power supply system, the arrangement of the IO buffers is not affected by the placement of the always-on power supply area. As a result, the degree of flexibility of the arrangement of the buffers and the always-on power supply area increases.

In accordance with the present invention, the IO output can be held even in a standby mode. Further, it is possible to provide a microcomputer that is less constrained in terms of the always-on power supply area and the IO buffers.

BRIEF DESCRIPTION OF THE DRAWINGS

The above and other exemplary aspects, advantages and features will be more apparent from the following description of certain exemplary embodiments taken in conjunction with the accompanying drawings, in which:

FIG. 6 shows a relation of IO output hold states in a microcomputer in accordance with a third exemplary embodiment of the present invention;

DETAILED DESCRIPTION OF THE EXEMPLARY EMBODIMENTS

First Exemplary Embodiment

Figure 1:
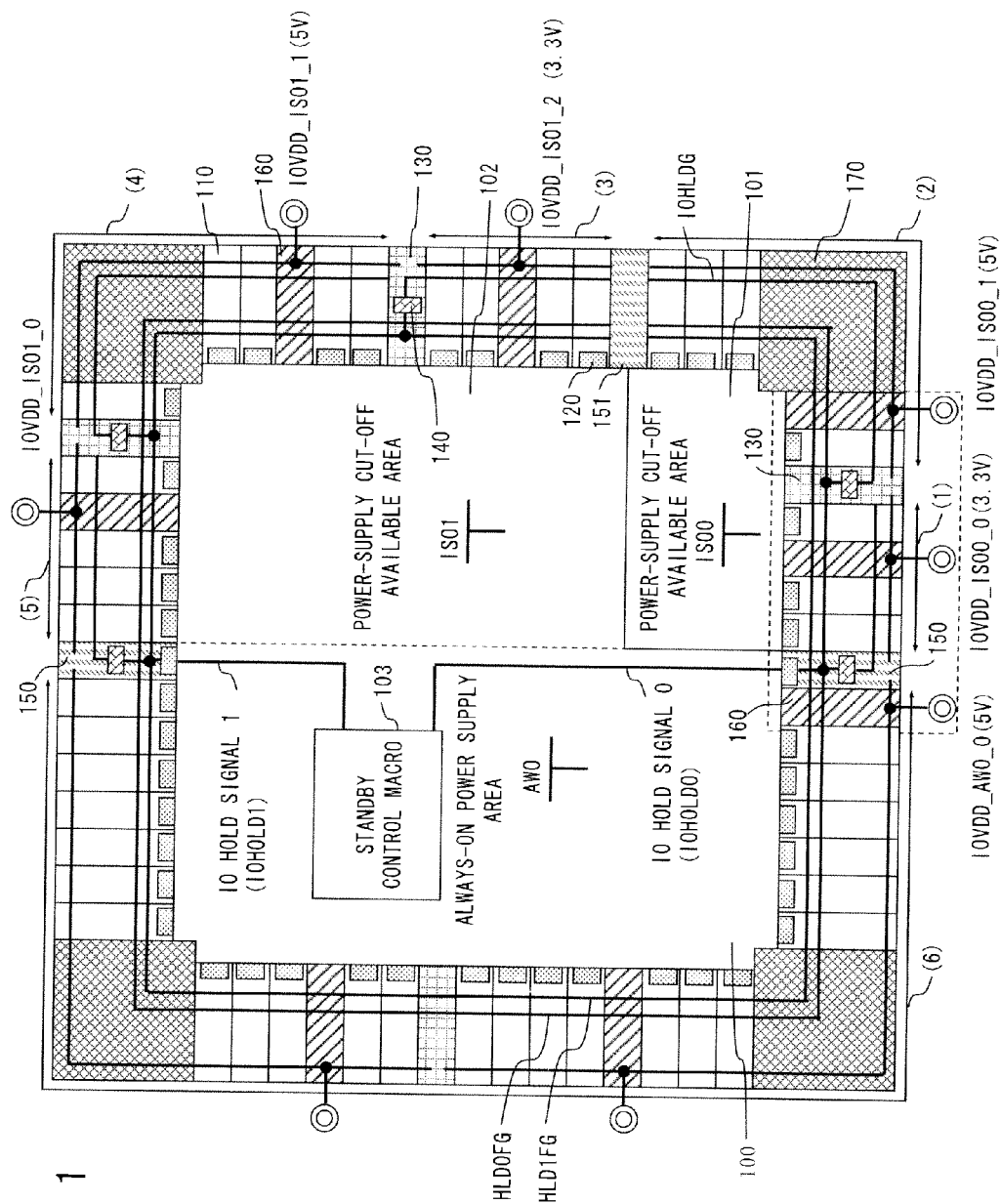
FIG. 1 is a configuration diagram of a microcomputer in accordance with a first exemplary embodiment of the present invention.
Figure 2:
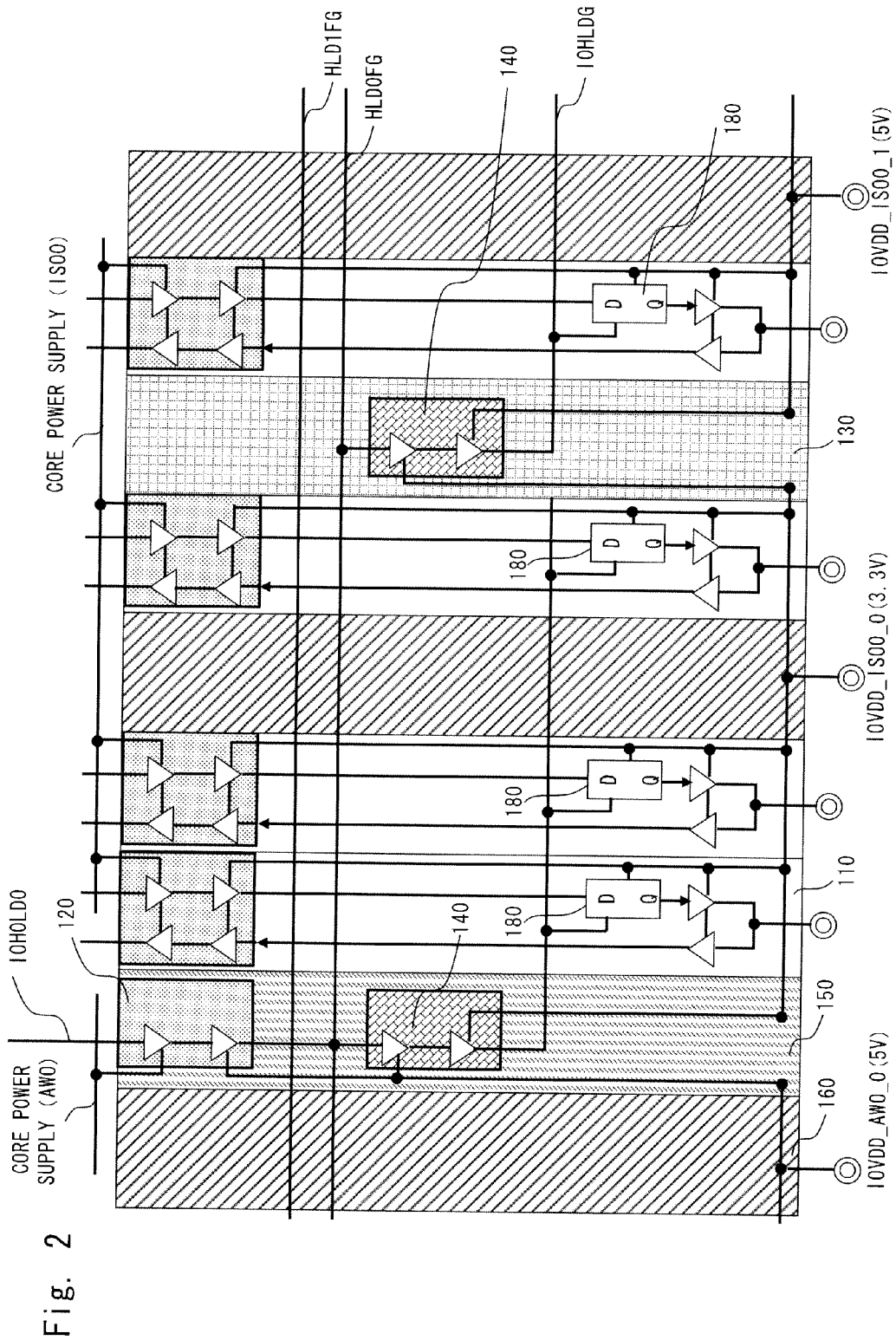
FIG. 2 is a block diagram showing an IO buffer 110 and other elements in a microcomputer in accordance with a first exemplary embodiment of the present invention.

Exemplary embodiments in accordance with the present invention are explained hereinafter with reference to the drawings. FIG. 1 shows a microcomputer in accordance with a first exemplary embodiment of the present invention. FIG. 2 is an enlarged view of an area indicated by the broken line in FIG. 1.

An always-on power supply area 100 is an area that operates with an internal power supply system. The always-on power supply area 100 is an area where the internal power supply (core power supply) is supplied even in a standby mode and the power supply is not thereby cut off even in the standby mode. Similarly to the always-on power supply area 100, power supply cut-off available areas 101 and 102 are also areas that operate with an internal power supply system. The power supply cut-off available areas are areas where the internal power supply is not supplied in a standby mode and the power supply is thereby cut off in the standby mode. The number of the power supply cut-off available areas can be arbitrarily determined. The setting whether the power supply is cut off in the standby mode or not can be made for each of the power supply cut-off available areas. In the following explanation, the term "internal logic" means the always-on power supply area 100 or the power supply cut-off available areas 101 and/or 102.

A plurality of IO buffers 110 are disposed on the periphery of the always-on power supply area 100 and the power supply cut-off available areas 101 and 102. The IO buffers 110 operate with an IO power supply system (IOVDD) whose voltage is different from the voltage of the internal power supply. The IO buffers 110, which are disposed between power supply terminals, operate at different voltages. The IO buffers 110 are divided into groups each of which operates at a different voltage. In the example shown in FIG. 1, each of the IO buffers 110 operates with an IO power supply having a voltage of 5V or 3.3V. As shown in FIG. 1, the IO buffers 110 are supplied with electric power from power supply pins (IOVDD_AWO_n, IOVDD_ISO0_n, and IOVDD_ISO1_n) of the IO power supply system. As shown in FIG. 2, the IO buffer 110 includes a latch 180 therewithin, and holds an IO output of the power supply cut-off available area 101 or 102 in a standby mode by using this latch. That is, an output signal from the power supply cut-off available area 101 or 102 is input to the data input terminal of the latch 180.

A core-power-supply-IO-power-supply level shifter 120 is a level shifter that is disposed inside the IO buffer 110. The core-power-supply-IO-power-supply level shifter 120 shifts the level of a signal output from the internal logic so that the signal level conforms to the voltage of the IO power supply system. Further, the core-power-supply-IO-power-supply level shifter 120 shifts the level of a signal that is output from the IO buffer 110 to the internal logic so that the signal level conforms to the operating voltage of the internal logic.

Cut cells 130 are disposed on the periphery of the always-on power supply area 100 and the power supply cut-off available areas 101 and 102. The cut cells 130 are disposed so as to isolate the IO buffers 110 from VDD buffers 160. Similarly to the IO buffers 110, the cut cells 130 operate at the voltage of the IO power supply system. The cut cell 130 includes an IO-power-supply-IO-power-supply level shifter 140 therewithin. The IO-power-supply-IO-power-supply level shifter 140 operates with the IO power supply system. A voltage of 3.3V and a voltage of 5V are supplied to the IO-power-supply-IO-power-supply level shifter 140. The IO-power-supply-IO-power-supply level shifter 140 shifts the level of a signal flowing through the cut cell 130 so that the voltage gap between the adjacent IO buffers 110 is bridged.

Domain cut cells 150 and 151 are a kind of the cut cell 130. The domain cut cell 150 or 151 is disposed on the boundary between two power supply cut-off available areas, and between the always-on power supply area 100 and each of the power supply cut-off available areas. The domain cut cell 151 corresponding to the boundary between two power supply cut-off available areas cuts off an IOHOLD signal that is wired in a circular manner. The domain cut cell 150 corresponding to the boundary between the always-on power supply area (AWO) 100 and the power supply cut-off available area includes an IO-power-supply-IO-power-supply level shifter 140 that operates with the IO power supply system therewithin.

Lines HLDnFG are wired so as to go round the IO buffers 110, the cut cells 130, and the like, and also connected to a standby control macro 103. The same number of the lines HLDnFG as the number of the power supply cut-off available areas are provided. Each of the lines HLDnFG corresponds to a respective one of the power supply cut-off available areas. For example, HLD0FG is a line corresponding to the power supply cut-off available area 101. Similarly, HLD1FG is a line corresponding to the power supply cut-off available area 102.

A standby control macro 103 is disposed inside the always-on power supply area 100. The standby control macro 103 outputs an IO output hold signal (hereinafter also referred to as "IOHOLD signal") that is used to instruct the IO buffer 110 to hold an IO output before the microcomputer enters a standby mode. The level of the output IOHOLD signal is shifted to the level of the voltage of the power supply system by the core-power-supply-IO-power-supply level shifter 120 located within the domain cut cell 150. The IOHOLD signal whose level was shifted is supplied to a line (HLDnFG) corresponding to a respective one of the power supply cut-off available areas. For example, when the internal power supply of the power supply cut-off available area 101 is to be cut off in a standby mode, the standby control macro 103 outputs IOHOLD0 (IOHOLD0=1) indicating the holding of the IO output(s) of the power supply cut-off available area 101 to the line HLD0FG. Similarly, when the internal power supply of the power supply cut-off available area 102 is to be cut off in a standby mode, the standby control macro 103 outputs IOHOLD1 (IOHOLD1=1) indicating the holding of the IO output(s) of the power supply cut-off available area 102 to the line HLD1FG. The level of the signal, whose level was shifted by the core-power-supply-IO-power-supply level shifter 120, is shifted by the IO-power-supply-IO-power-supply level shifter 140 so that the signal level conforms to the voltage of an adjacent IO buffer 110. The signal, whose level was shifted by the IO-power-supply-IO-power-supply level shifter 140, is supplied to the adjacent IO buffer 110 through a line IOHLDG.

The line IOHLDG is wired so as to go round the IO buffers 110, the VDD buffers 160, and corner cells 170. Note that the line IOHLDG is connected to one of the lines HLDnFG, which corresponds to one of the power supply cut-off available areas 101 and 102 to which the IO buffer 110 is adjacent, inside the cut cell 130. For example, in the case of the inside of the cut cell 130 adjacent to the power supply cut-off available area 0, the line IOHLDG is connected to HLD0FG. The line IOHLDG is used to supply a latch enabling signal (signal supplied to the line IOHLDG), which is used to hold an IO output, to each of the IO buffers 110. The line IOHLDG is connected from the cut cell 130, which is connected to the line HLDnFG, to each of the IO buffers 110 and the like that are located between that cut cell 130 and another cut cell 130.

The VDD buffer 160 is a buffer that is supplied with electric power from an IO power supply pin. The VDD buffer 160 supplies the supplied electric power to the IO buffers 110, the cut cells 130, and the corner cells 170 located in its periphery through a line(s). The corner cells 170 are cells that are disposed at the four corners of the microcomputer chip. The corner cell 170 is supplied with electric power through a line wired from the VDD buffer 160.

IOVDD_AWO_n is a power supply pin that supplies electric power to the IO buffers 110, the cut cells 130, and the like that are adjacent to the always-on power supply area 100. IOVDD_ISO0_n is a power supply pin that supplies electric power to the IO buffers 110, the cut cells 130, and the like that are adjacent to the power supply cut-off available area 101. IOVDD_ISO1_n is a power supply pin that supplies electric power to the IO buffers 110, the cut cells 130, and the like that are adjacent to the power supply cut-off available area 102. Each of these power supply pins supplies the voltage (5V or 3.3V in the figure) of the IO power supply system to the IO buffers 110 and the like. IOVDD_AWO_n, IOVDD_ISO0_n, and IOVDD_ISO1_n are power supplies that are an On-state even in a standby mode.

Next, an operation performed when the microcomputer in accordance with this exemplary embodiment of the present invention enters a standby mode is explained with reference to FIGS. 1 and 2. In the following explanation, assume that the power supply to the power supply cut-off available area 101 is cut off when the microcomputer enters to a standby mode.

The standby control macro 103 outputs IOHOLD0 (IOHOLD0=1) indicating the holding of the IO output(s) of the power supply cut-off available area 101 before the microcomputer enters a standby mode. The level of IOHOLD0 is shifted to the level of the voltage of the IO power supply system by the core-power-supply-IO-power-supply level shifter 120, and then IOHOLD0 is output to the line HLD0FD. Further, the level of the signal, whose level was shifted, is shifted by the IO-power-supply-IO-power-supply level shifter 140 located within the domain cut cell 150 so that the signal level conforms to the voltage of adjacent IO buffers 110. The signal, whose level was shifted by the IO-power-supply-IO-power-supply level shifter 140, is supplied to the line IOHLDG.

The signal supplied to the line IOHLDG is a signal that is used to instruct the latch 180 whether or not the IO output of the adjacent power supply cut-off available area should be held (hereinafter, the single supplied to the line IOHLDG is also referred to as "latch enabling signal").

When the latch enabling signal that is used to instruct the IO buffer 110 to hold the IO output is input to the latch 180, the latch 180 latches the value of the IO output of the power supply cut-off available area 101.

After entering the standby mode, the power supply to the power supply cut-off available area 101 is cut off. However, the IO buffers 110 adjacent to the power supply cut-off available area 101 continue to operate at the voltage of the IO power supply system that is not cut off even in the standby mode. Therefore, when recovering from the standby mode to a normal mode, the IO output value is held by the latch 180 in the IO buffer 110. At the time of recovery from the standby mode, the microcomputer in accordance with this exemplary embodiment performs a booting process and a series of subsequent processes by using this IO output.

Next, advantageous effects of the microcomputer in accordance with the first exemplary embodiment of the present invention are explained hereinafter. As described above, the IO output hold signal (IOHOLD signal) indicating the holding of the IO output is supplied so as to go round the IO buffers 110. Since the IO buffers 110 operate with the IO power supply system, it is possible to eliminate the need for supplying electric power from the always-on power supply area 100 to the IO buffers just by disposing the IO power supply pin(s) (IOVDD_ISOn_n). As a result, there is no need to increase the area of the always-on power supply area 100, thus contributing the reduction in the chip size. Further, in the microcomputer in accordance with this exemplary embodiment, since there is no need to dispose the always-on power supply area 100 so as to surround the power supply cut-off available areas 101 and 102, the above-described IR drop problem does not arise.

Furthermore, the IO-power-supply-IO-power-supply level shifter 140 in the cut cell 130 operates with the IO power supply system that is always in an On-state. Therefore, the IO output hold signal does not become an unknown state even when the microcomputer enter a standby mode, thus making it possible to properly perform the holding operation of the IO output.

Second Exemplary Embodiment

In a microcomputer in accordance with a second exemplary embodiment of the present invention, an IO power supply is wired in a circular manner and electric power is supplied from that IO power supply to IO-power-supply-IO-power-supply level shifters located within the cut cells and the domain cut cells. In this configuration, an IO power supply that supplies electric power to IO buffers adjacent to a power supply cut-off available area for which the IO output(s) does not need to be held is cut off in a standby mode. Note that it is desirable that the power supply cut-off available area can properly operate from a reset state without being affected by the values of the latches located within the IO buffers that become unknown states when the IO power supply is turned on at the time of recovery from a standby mode. For the holding of the IO outputs of the microcomputer having this configuration, the components and configurations that are different from those of the first exemplary embodiment are explained hereinafter.

Figure 3:
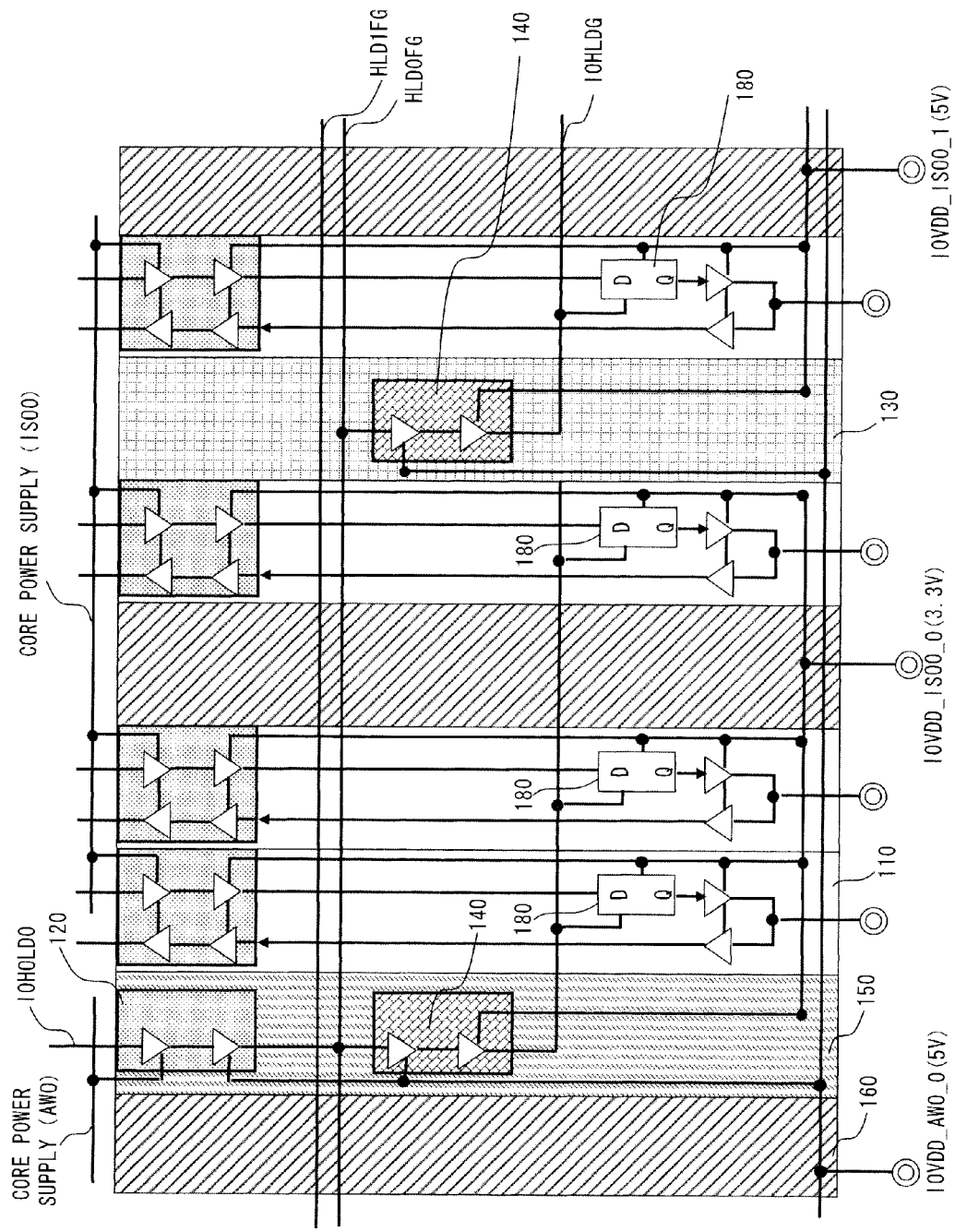
FIG. 3 is a block diagram showing an IO buffer 110 and other elements in a microcomputer in accordance with a second exemplary embodiment of the present invention.

FIG. 3 is a block diagram showing IO buffers 110, cut cells 130, domain cells 150, and VDD buffers 160 in a microcomputer in accordance with this exemplary embodiment of the present invention. In this exemplary embodiment, the line from the power supply IOAWO_n that supplies electric power to the IO buffers 110 and the like adjacent to the always-on power supply area 100 is wired in a circular manner so that the line also supplies electric power to the IO buffers 110 and the like adjacent to the power supply cut-off available areas 101 and 102.

The IO-power-supply-IO-power-supply level shifters 140 in the domain cells 150 and the cut cells 130 are supplied with electric power through a circular line connected to the power supply IOVDD_AWO_n.

Figure 4:
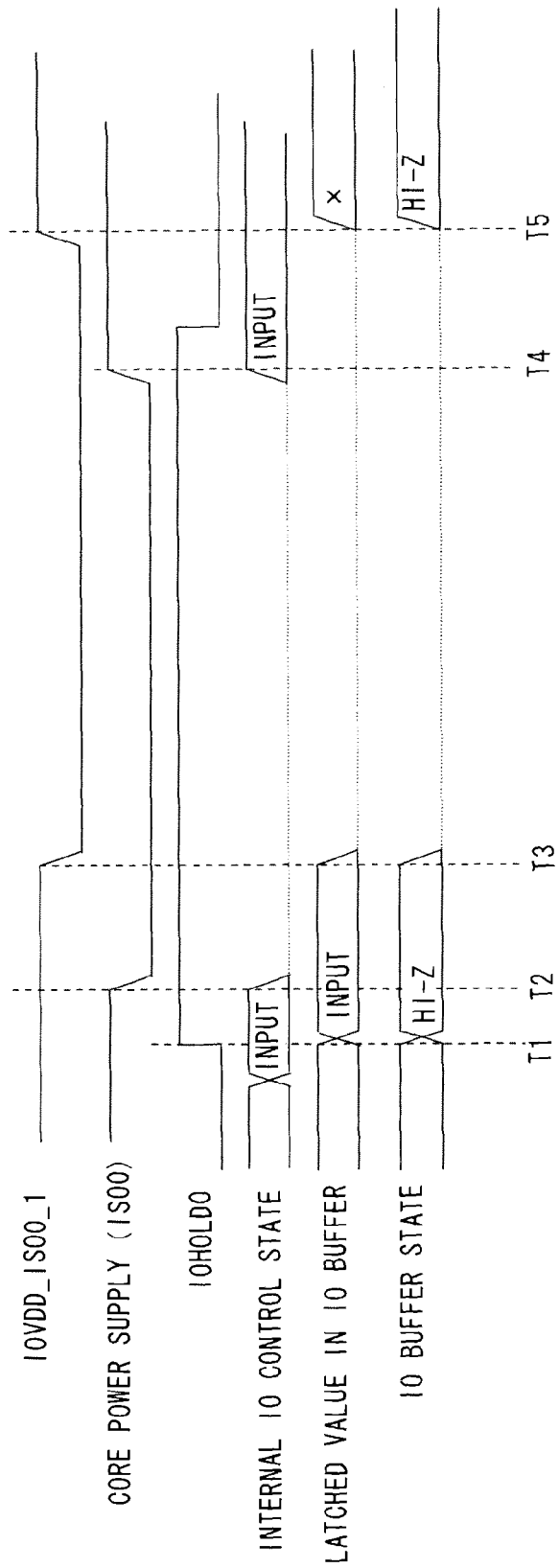
FIG. 4 is a timing chart showing an operation performed when entering a standby mode in accordance with a second exemplary embodiment of the present invention.

Next, operations performed when the microcomputer in accordance with this exemplary embodiment enters a standby mode and when it recovers from the standby mode are explained. FIG. 4 is a timing chart showing an operation of an IO buffer 110 connected to an IO power supply that cuts off the power supply when the microcomputer enters a standby mode. In FIG. 4, it is assumed that the power supply to the power supply cut-off available area 101 is cut off in a standby mode. Operations performed when the microcomputer in accordance with this exemplary embodiment enters a standby mode and when it recovers from the standby mode are explained with reference to FIGS. 1, 3 and 4.

The standby control macro 103 outputs IOHOLD0 (IOHOLD0=1) indicating the holding of the IO output(s) of the power supply cut-off available area 101 before the microcomputer enters a standby mode (T1). Each of the IO buffers 110 to which the signal IOHOLD0 (IOHOLD0=1) is input holds an IO output value by using the latch 180 in the IO buffer 110. Since the internal IO control state (internal logic state) is "input" at this point, the latch 180 holds this value ("input") as an IO output state. Further, since the latch control state of each of the IO buffers 110 to which IOHOLD0 (IOHOLD0=1) is input is "input", these IO buffers 110 become a high-impedance state (HI-Z). After that, the power supply (core power supply (ISO0)) to the power supply cut-off available area 101 is cut off (T2).

After the power supply to the power supply cut-off available area 101 is cut off, an IO power supply(s) that supplies electric power to the IO buffers 110 and the like that do not need to be supplied with electric power, among the IO power supplies that supply electric power to the IO buffers 110 and the like adjacent to the power supply cut-off available area 101, is cut off (T3). The IO buffers 110 and the like that do not need to be supplied with electric power mean a port group(s) that does not need to hold the IO output(s) of the adjacent internal logic in the standby mode. In the example shown in FIG. 4, IOVDD_ISO0_1 is cut off.

When the mode is changed from the standby mode to a normal mode, the power supply cut-off available area 101 is first powered on (T4). Further, the internal IO control states of the power supply cut-off available area 101 are started from the "input" state by a reset process. When the power supply cut-off available area 101 is powered on, the standby control macro 103 outputs an IOHOLD0 signal (IOHOLD0=0) indicating the clearing of the IO output hold state (IO output is not to be held) (T5).

After the IOHOLD0 signal (IOHOLD0=0) indicating the clearing of the IO output hold state (IO output is not to be held) is supplied, IOVDD_ISO0_1 is powered on. Since IOVDD_ISO0_1 was in the turned-Off state, the latches 180 in the IO buffers 110 connected to IOVDD_ISO0_1 are not holding their values. Since the IOHOLD0 signal (IOHOLD0=0) indicating the clearing of the IO output hold state (IO output is not to be held) is output at this point, the latches 180 do not hold the IO output values of the power supply cut-off available area 101 after IOVDD_ISO0_1 is powered on. Since the latches 180 do not hold the IO output values, the internal IO control states of the power supply cut-off available area 101, to which the power supply has been cut off, remain unchanged from the "input" state irrespective of the values of the latches 180. Each of the IO buffers 110 becomes a high-impedance state (HI-Z).

In the series of processes described above, owing to the above-described cut-off of the IO power supply, the power consumption can be reduced even further in comparison to the configuration of the first exemplary embodiment.

Further, such a situation that, after IOHOLD is cleared, the latch 180 in the IO buffer 110 holds an incorrect value due to the power-on of the IO power supply never occurs. Therefore, the internal IO control states of the power supply cut-off available area, to which the power supply has been cut off, are always set to correct values. That is, it is ensured that the power supply cut-off available area adjacent to the IO buffers 110 and the like that have not been supplied with the IO power supply always starts its operation from the reset state when the microcomputer recovers from a standby mode.

Note that in this exemplary embodiment, since the IO power supply is wired in a circular manner, the effect of the IR drop is examined hereinafter. The IOHOLD signal is implemented as a signal having a low frequency as viewed in an alternating-current fashion. In contrast to this, level shifters and the like on the internal logic side need to operate at a high frequency as viewed in an alternating-current fashion. For example, the level shifters on the internal logic side need to operate at 80 MHz. Further, the power supply margin is large in the IO power supply system. In contrast to this, the power supply margin is small on the internal logic side. For example, the power supply on the internal logic side needs to operate at around 1.2±0.1 V. Therefore, the effect of the IR drop is small in the configuration in accordance with this exemplary embodiment of the present invention in comparison to the cases where the internal logic power supply is wired in a circular manner.

Third Exemplary Embodiment

In a microcomputer in accordance with a third exemplary embodiment of the present invention, the cut cell includes a latch used to hold a signal output from the power supply cut-off available area, and that signal is used as a command signal for instructing adjacent IO buffers to hold an IO output. Similarly to the second exemplary embodiment, a microcomputer in accordance with a third exemplary embodiment of the present invention can cut off the IO power supply that supplies electric power to the IO buffers 110 and the like that do not need to be supplied with electric power in a standby mode. For the holding of the IO outputs of the microcomputer having this configuration, the components and configurations that are different from those of the first and second exemplary embodiments are explained hereinafter.

Figure 5:
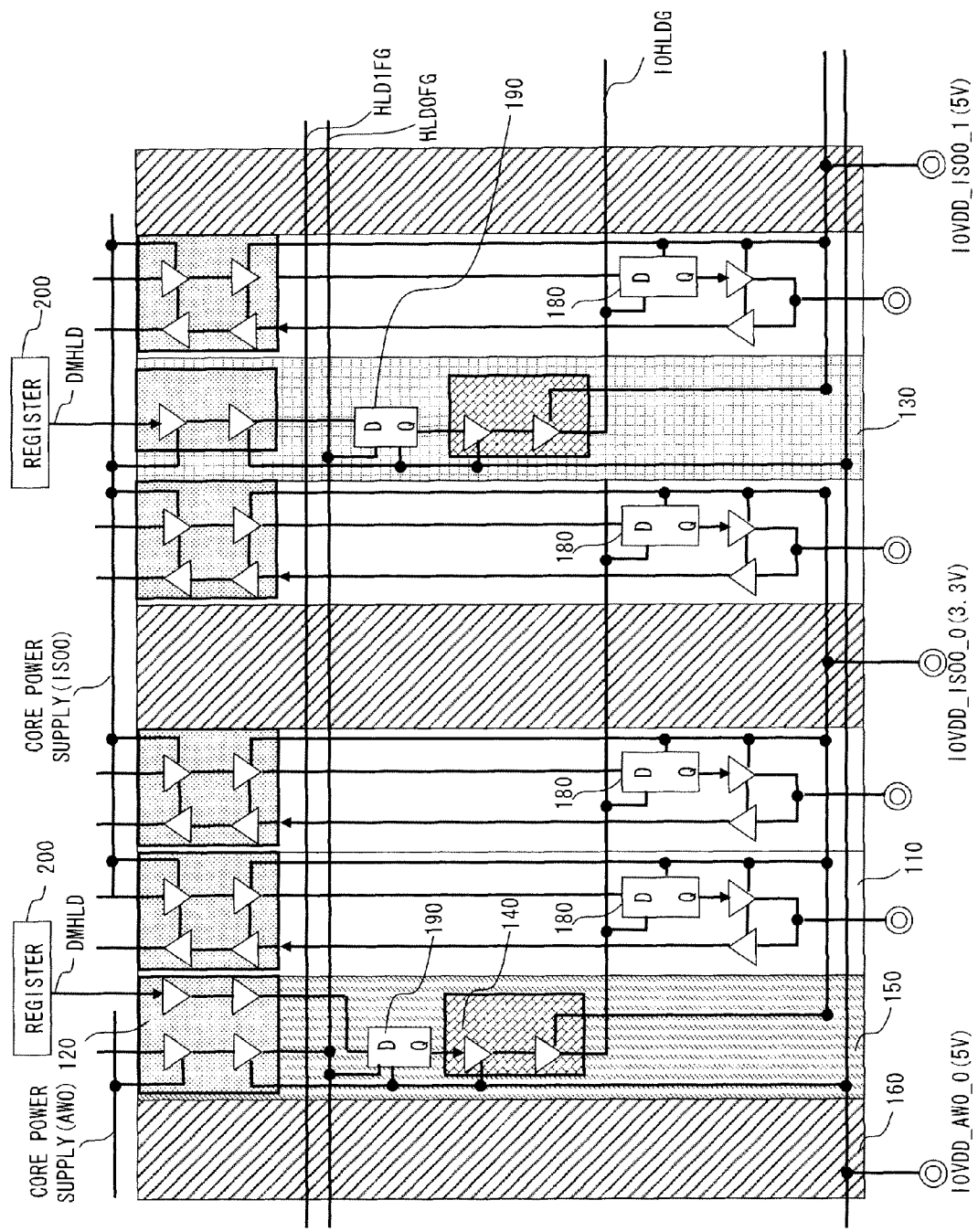
FIG. 5 is a block diagram showing an IO buffer 110 and other elements in a microcomputer in accordance with a third exemplary embodiment of the present invention.

FIG. 5 is a block diagram showing IO buffers 110, cut cells 130, domain cells 150, and VDD buffers 160 in a microcomputer in accordance with this exemplary embodiment of the present invention. In comparison to the microcomputer in accordance with the second exemplary embodiment, the cut cell 130 includes a latch 190 and a core-power-supply-IO-power-supply level shifter 120 in the microcomputer in accordance with this exemplary embodiment. Further, the internal logic includes a register 200. A configuration of the microcomputer in accordance with this exemplary embodiment is explained hereinafter with reference to FIGS. 1 and 5.

The register 200 holds a command value that is used to instruct the IO buffers 110 whether or not the IO outputs should be held in a standby mode. The internal logic outputs a value held in the register 200 to the cut cell 130 as a signal (DMHLD). The core-power-supply-IO-power-supply level shifter 120 in the cut cell 130 shifts the level of the signal (DMHLD) output from the internal logic to the level of the voltage of the IO power supply system, and outputs the signal whose level was shifted to the latch 190. The latch 190 holds the signal value output from the core-power-supply-IO-power-supply level shifter 120.

For example, in the example of FIG. 1, the internal logic outputs, for the areas (1) to (6), signals DMHLD each corresponding to one of these areas to the cut cells 130, and by doing so, instructs them whether or not IO outputs should be held in a standby mode. DMHLD takes on one of two values, i.e., a value indicating the holding of the IO output (DMHLD=1) or a value indicating the non-holding of the IO output (DMHLD=0). Similarly to the second exemplary embodiment, when some of the IO buffers 110 do not hold their IO outputs in a standby mode, the IO power supply that supplies electric power to those IO buffers 110 can be cut off in the standby mode.

The latch 190 holds the value of the signal DMHLD, and outputs that value to the IO-power-supply-IO-power-supply level shifter 140 in the cut cell 130 before the microcomputer enters a standby mode. Note that when the signal DMHLD has a value indicating the clearing of the IO output hold state (IO output is not to be held) (DMHLD=0), the output signal from the IO-power-supply-IO-power-supply level shifter 140 in the cut cell 130 becomes a signal indicating the non-holding of the IO output even when the IOHOLD signal is a signal indicating the holding of the IO output (IOHOLD=1). That is, a higher priority is given to the value output from the latch 190 in the determination of the output signal from the IO-power-supply-IO-power-supply level shifter 140 in the cut cell 130.

At the time of recovering from the standby mode, when a signal indicating the holding of an IO output is input from the IO-power-supply-IO-power-supply level shifter 140 in the cut cell 130 to the latch 180 in the IO buffer 110, the latch 180 performs a process for holding the IO output from the internal logic.

FIG. 6 shows a relation of IO output hold states in a microcomputer in accordance with this exemplary embodiment in a case where the power supply to the power supply cut-off available area 101 is cut off in a standby mode. FIG. 6 shows an IO output hold operation of the IO buffer 110 performed when an IOHOLD0 signal and a DMHLD signal are input to the cut cell 130 of each of the areas (areas (1) and (2) in FIG. 1). Even when the value of IOHOLD0 is a value indicating the holding of the IO output (IOHOLD0=1), the IO buffer 110 does not hold the IO output when the value of DMHLD is a value indicating the non-holding of the IO output (DMHLD=0). For example, even if IOHOLD0=1 is input to the area (1), the IO buffer 110 does not hold the IO output in the standby mode when DMHLD=0.

Figure 7:
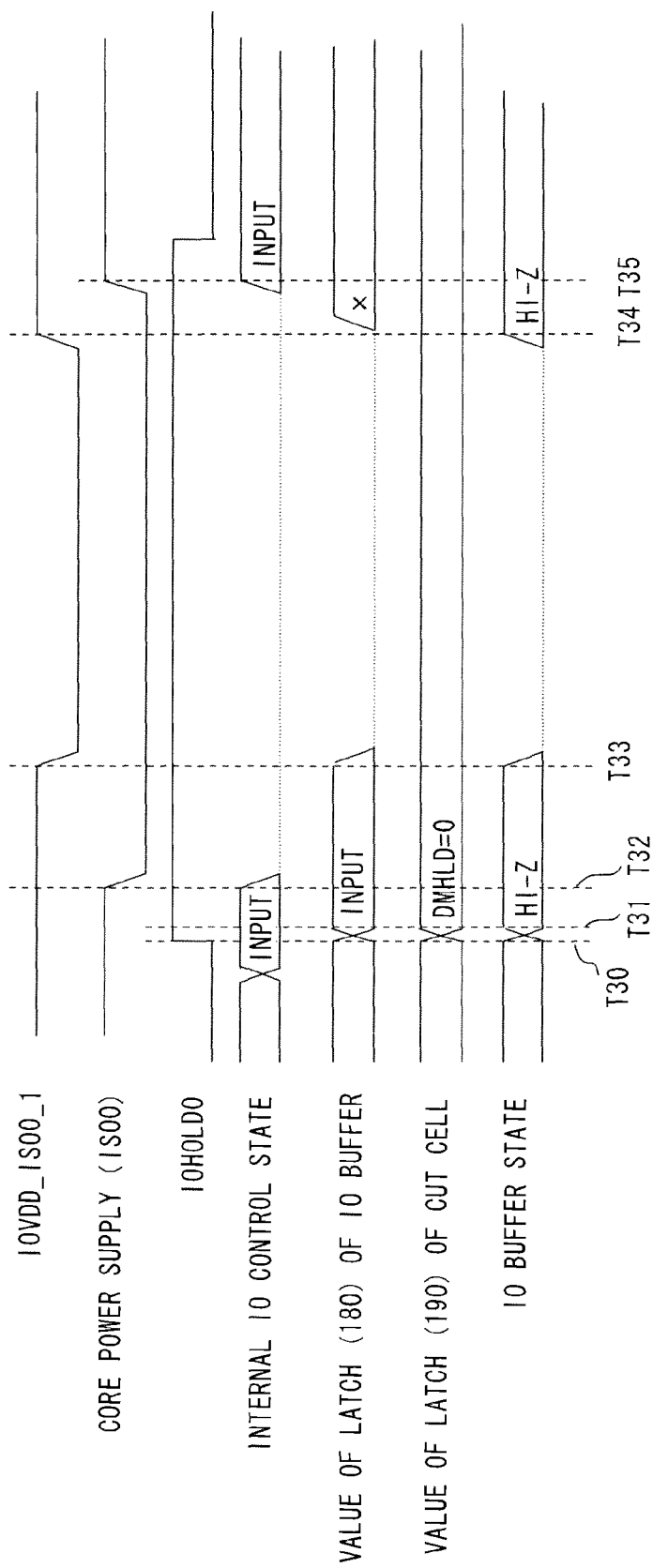
FIG. 7 is a timing chart showing an operation performed when entering a standby mode in accordance with a third exemplary embodiment of the present invention.
Figure 8:
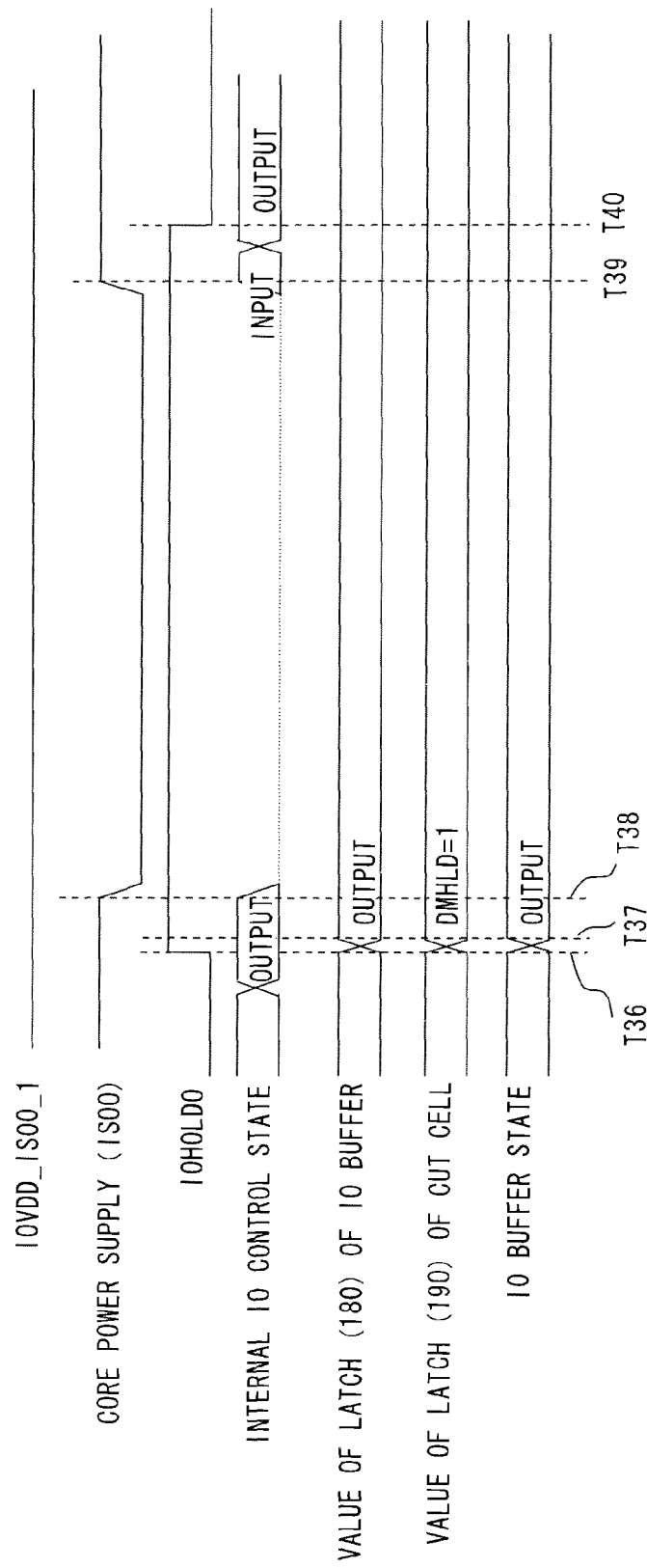
FIG. 8 is a timing chart showing an operation performed when entering a standby mode in accordance with a third exemplary embodiment of the present invention.
Figure 9:
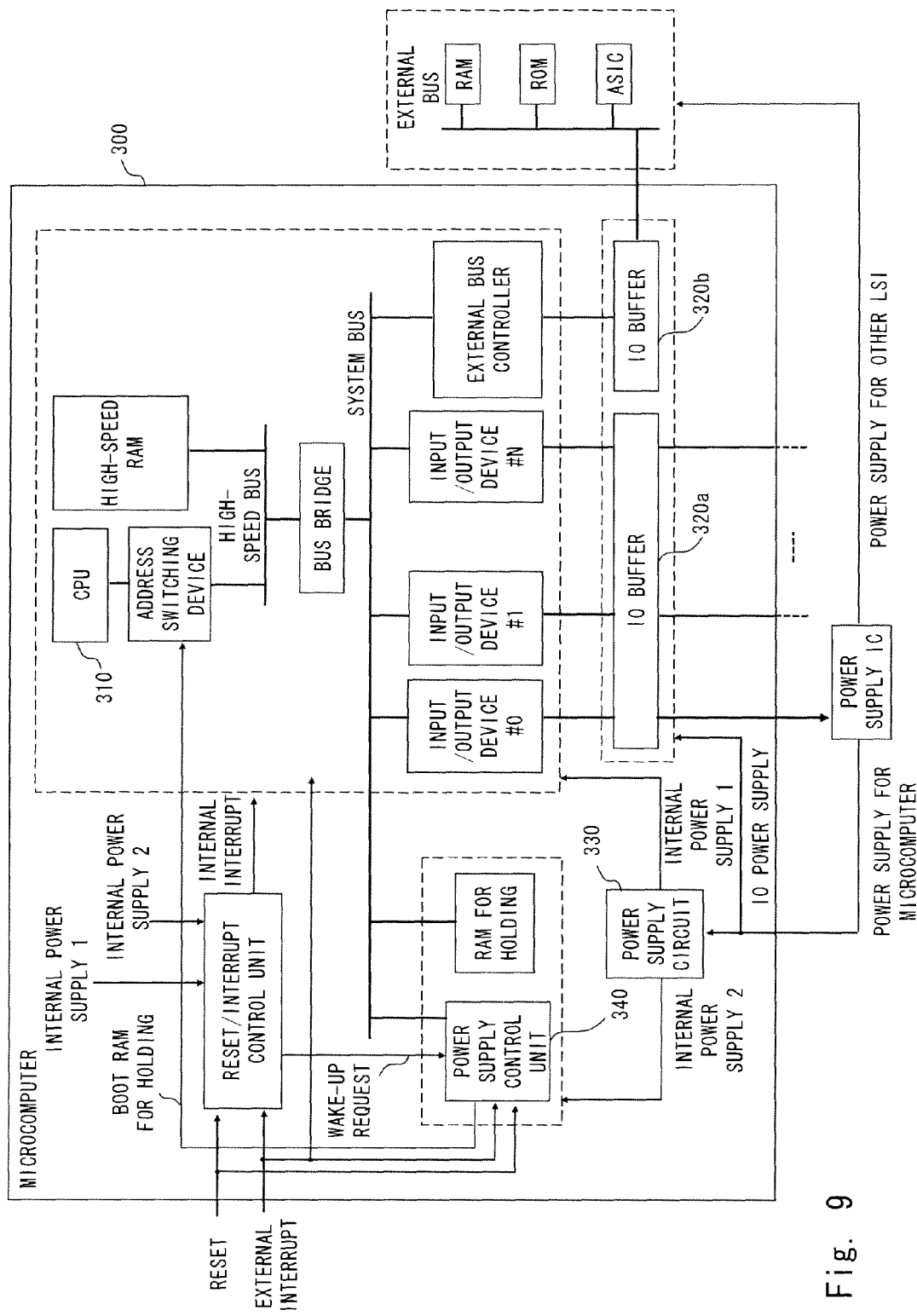
FIG. 9 is a configuration diagram of a microcomputer in related art.
Figure 10:
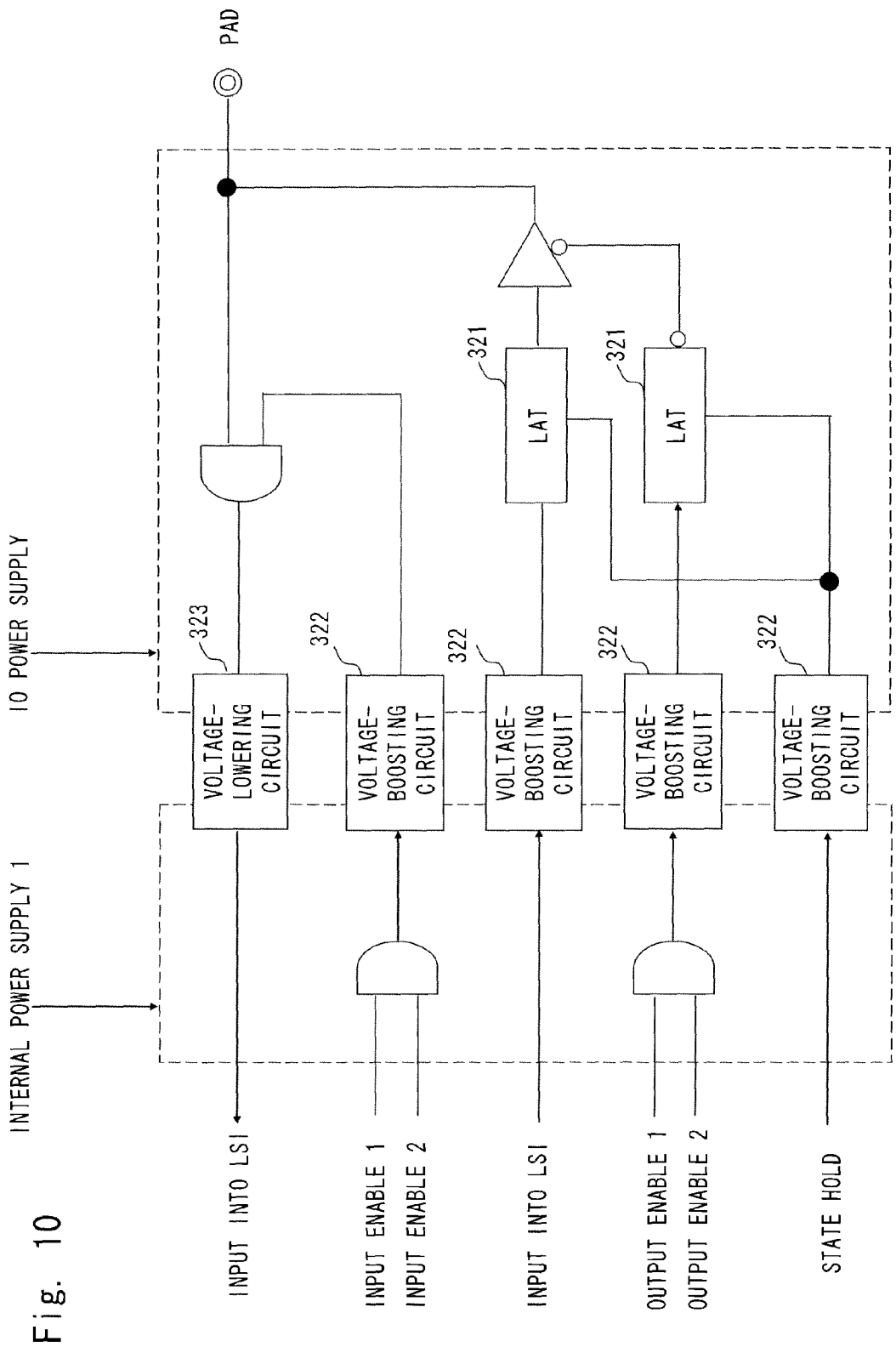
FIG. 10 is a block diagram showing an IO buffer in a microcomputer in related art.
Figure 11:
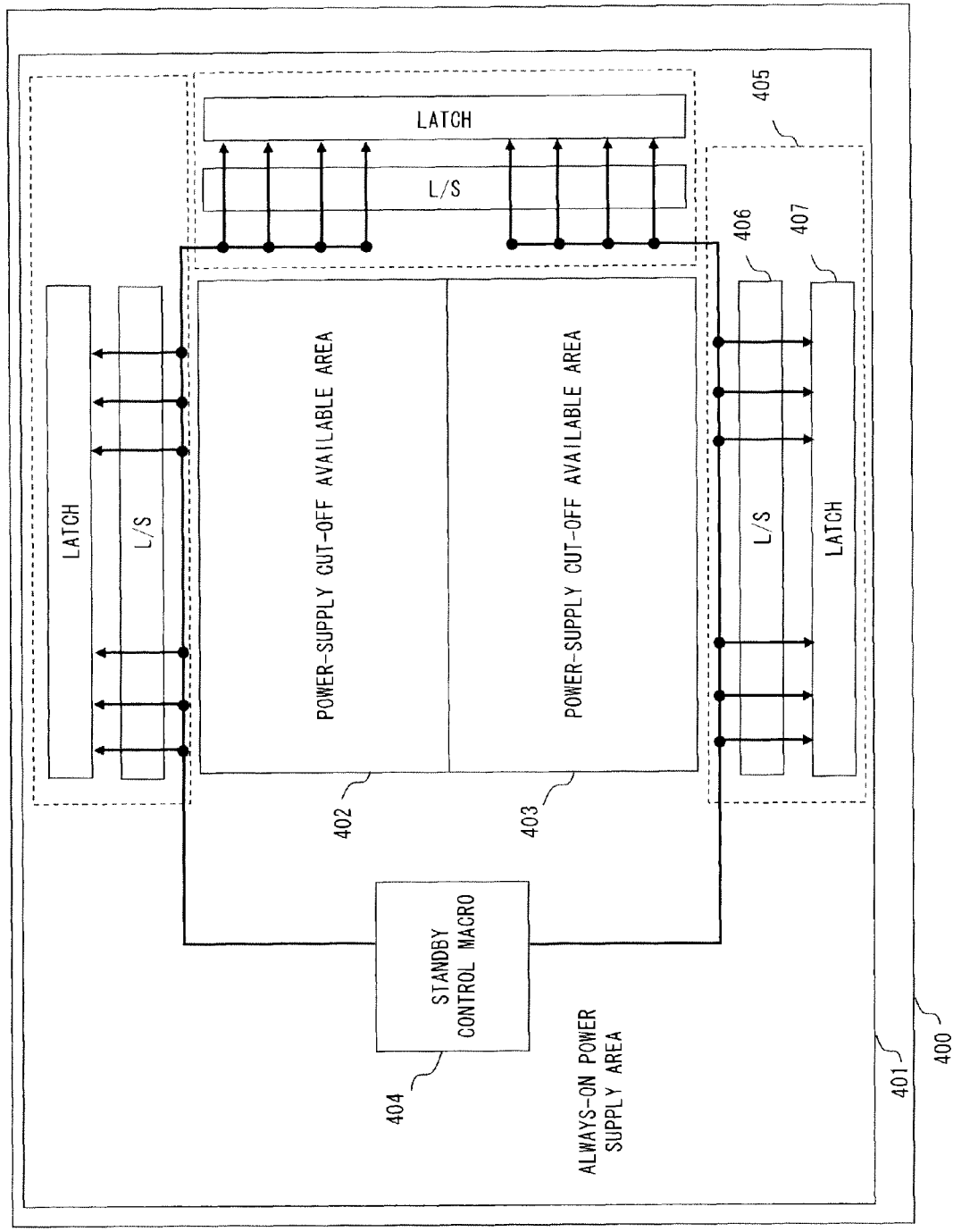
FIG. 11 is a conceptual diagram showing a configuration of a microcomputer in which level sifters are supplied with electric power from a power supply that is always in an On-state.

Next, operations performed when the microcomputer in accordance with this exemplary embodiment enters a standby mode and when it recovers from the standby mode are explained. FIGS. 7 and 8 are timing charts showing operations performed when entering a standby mode and when recovering from the standby mode. In FIGS. 7 and 8, it is assumed that the power supply to the power supply cut-off available area 101 is cut off in a standby mode.

FIG. 7 shows a timing chart regarding an operation of an IO buffer 110 that does not need to be supplied with electric power when the power supply to the power supply cut-off available area 101 is cut off, i.e., an IO buffer 110 that does not hold the IO output state of an adjacent power supply cut-off available area 101. In FIG. 7, it is assumed that the power supply to the power supply cut-off available area 101 is cut off in a standby mode. An operation relating to the IO buffer 110 that does not need to be supplied with electric power in a standby mode is explained hereinafter with reference to FIG. 7.

The standby control macro 103 outputs IOHOLD0 (IOHOLD0=1) indicating the holding of the IO output(s) of the power supply cut-off available area 101 before the microcomputer enters a standby mode (T30). The internal logic outputs a signal DMHLD (DMHLD=0) indicating that the latch 180 in the IO buffer 110 does not hold the IO output (T31). As a result, the latch 190 in the cut cell 130 holds a value (DMHLD=0) indicating the non-holding of the IO output. Since the latch 190 is supplied with electric power from IOVDD_AWO_n that is always in a turned-On state, it holds the value even when IOVDD_ISO0_n and the core power supply (ISO0) are cut off at a later time. The latch 180 in the IO buffer 110 holds the internal IO control state, which is "input". After that, the core power supply (ISO0) and IOVDD_ISO0_1 are cut off (T32 and T33).

When the mode is changed from the standby mode to a normal mode, IOVDD_ISO0_1 or the core power supply (ISO0) is powered on (T34 or T35). Note that either one of them can be powered on first. For example, if IOVDD_ISO0_1 is turned on first, a value (DMHLD=0) indicating the non-holding of the IO output is input from the latch 190 to the latch 180 through the IO-power-supply-IO-power-supply level shifter 140. In the configuration of the microcomputer in accordance with this exemplary embodiment, a high priority is given to the value output from the latch 190 over the value of the IOHOLD signal. Since the value input from the latch 190 is a value (DMHLD=0) indicating the non-holding of the IO output, the latch 180 operates in a state where it does not hold the IO output of the adjacent power supply cut-off available area 101. Even if the core power supply (ISO0) is turned on first, a value (DMHLD=0) indicating the non-holding of the IO output is input from the latch 190 to the latch 180 through the IO-power-supply-IO-power-supply level shifter 140. Therefore, the latch 180 does not hold the IO output of the adjacent power supply cut-off available area 101.

When the core power supply (ISO0) is turned on, the internal IO control states of the power supply cut-off available area 101 become the "input" state, which is the initial state, by a reset process. Since the latches 180 do not hold the output values, the internal IO control states of the power supply cut-off available area 101, to which the power supply has been cut off, remain unchanged from the "input" state irrespective of the values of the latches 180. The IO buffers 110 operate from a HI-Z state when IOVDD_ISO0_1 becomes an On-state.

FIG. 8 shows a timing chart regarding an operation of an IO buffer 110 for which the IO power supply is supplied even when the power supply to the power supply cut-off available area 101 is cut off, i.e., an IO buffer 110 that holds the IO output state of an adjacent power supply cut-off available area 101. In FIG. 8, it is assumed that the power supply to the power supply cut-off available area 101 is cut off in a standby mode. An operation relating to the IO buffer 110 that needs to be supplied with electric power is explained hereinafter with reference to FIG. 8.

The standby control macro 103 outputs IOHOLD0 (IOHOLD0=1) indicating the holding of the IO output(s) of the power supply cut-off available area 101 before the microcomputer enters a standby mode (T36). Note that it is assumed that the latch 190 in the cut cell 130 holds a value (DMHLD=1) indicating the holding of the IO output (T37). The latch 180 of the IO buffer 110 holds "output", which is the value of the internal IO control state. Since IOVDD_ISO0_1 is not cut off even in a standby mode, the latch 180 in the IO buffer 110 continues to hold this value ("output"). After that, the core power supply (ISO0) is cut off (T38), and thereby entering a standby mode.

When the mode is changed from the standby mode to a normal mode, the core power supply (ISO0) is powered on (T39). When the core power supply (ISO0) is turned on, the internal IO control states of the power supply cut-off available area 0 (101) become the "input" state by the reset process. The latch 180 in the IO buffer 110 is holding "output" at this point. Therefore, the microcomputer in accordance with this exemplary embodiment sets the internal 10 control state to the same value as that of the latch 180. That is, it changes the value of the internal IO control state from "input" to "output" (T40). After the above-described setting is finished, the standby control macro 103 clears IOHOLD0 (IOHOLD0=0).

With the series of processes described above, the internal logic can instruct the IO buffers 110 whether or not the IO buffers 110 should hold the IO outputs for each of the areas of the IO buffers 110 into which the IO buffers 110 are partitioned with the cut cells 130. In this way, it is possible to hold the IO output for each of the areas of the IO buffers 110 into which the IO buffers 110 are partitioned with the cut cells 130. Further, the above-described configuration has another advantageous effect, in comparison to the first exemplary embodiment, that the IO output can be held for each of the areas of the IO buffers 110 just by providing the latch 190 in the cut cell 130. That is, the above-described advantageous effect can be achieved without changing the design of the IO buffers 110 and the IOHOLD signal.

The cut cell 130 includes the latch 190, and the latch 190 holds a signal indicating the holding of the IO output of adjacent IO buffers 110. The latch 190 is supplied with electric power from IOVDD_AWO_n that is always in an On-state. With this instruction signal, the latches 180 in the IO buffers 110 that do not need to be supplied with electric power in a standby mode can start to operate in a state where they do not hold the IO outputs at the time of recovery from the standby mode. Therefore, it is ensured that, at the time of recovery from the standby mode, the power supply cut-off available area adjacent to the IO buffers 110 and the like that have not been supplied with the IO power supply always starts its operation from the reset state regardless of which of the core power supply (ISO0) and IOVDD_ISOn_n is turned on first. That is, in contrast to the second exemplary embodiment, there is no restriction on the order of the power-on.

Note that the present invention is not limited to the above-described exemplary embodiments, and various modifications can be made without departing from the spirit of the present invention.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

The first to third exemplary embodiments can be combined as desirable by one of ordinary skill in the art.

What is claimed is:

1. A microcomputer comprising:
   a plurality of IO buffers that operate with an IO power supply system, the plurality of IO buffers being disposed on a periphery of an always-on power supply area and a power supply cut-off available area;
   at least one cut cell that operates with the IO power supply system, the at least one cut cell being disposed such that it isolates the IO buffers from each other;
   a standby control unit that outputs an IO output hold signal used to instruct the IO buffers whether or not the IO buffers should hold an IO output value of the power supply cut-off available area during a power saving mode, a power supply being cut off in the power supply cut-off available area during the power saving mode; and
   at least one line wired such that the at least one line is connected to the at least one cut cell and connected indirectly to the IO buffers, the at least one line is also connected to the standby control unit, wherein
   the standby control unit outputs the IO output hold signal to the line,
   the at least one cut cell comprises a level shifter that operates with the IO power supply system, the level shifter retrieves the IO output hold signal from the line corresponding to an adjacent power supply cut-off available area, the level shifter shifts a level of the IO output hold signal to a level of a power supply system with which an adjacent IO buffer operates, and the level shifter supplies the signal whose level is shifted to the adjacent IO buffer as a latch enabling signal used to instruct whether or not an IO output value should be held, and the IO buffer holds an IO output state of the adjacent power supply cut-off available area based on the latch enabling signal.

2. The microcomputer according to claim 1, wherein the IO buffer comprises:

a core-power-supply-IO-power-supply level shifter that shifts an internal logic level to a signal level conforming to an output signal voltage of the IO buffer; and an IO buffer latch that holds an output signal from the core-power-supply-IO-power-supply level shifter, and wherein the core-power-supply-IO-power-supply level shifter outputs a signal obtained by shifting a level of an IO output state of the power supply cut-off available area to the IO buffer latch.

3. The microcomputer according to claim 1, wherein a number of the lines is same as a number of the power supply cut-off available areas.

4. The microcomputer according to claim 1, wherein the level shifter in the cut cell is connected to a line wired from the IO power supply to which power supply is not cut off at all times, when entering a power saving mode, an IO power supply that supplies electric power to the IP buffer adjacent to the power supply cut-off available area for which an IO output state does not need to be held is cut off, and when recovering from the power saving mode, power supply to the power supply cut-off available area to which power supply has been cut off is turned on, and then after the latch enabling signal is supplied to the IO buffer, the IO power supply to which power supply has been cut off is powered on.

5. The microcomputer according to claim 1, wherein the cut cell comprises an instruction signal hold latch that holds an instruction signal instructing whether or not an IO state that is output from the power supply cut-off available area to the cut cell should be held, the instruction signal hold latch operates by electric power supplied from the IO power supply that is not cut off at all times, and the cut cell supplies a signal that indicates holding of an IO output based on a value held in the instruction signal hold latch to the adjacent IO buffer.

6. The microcomputer according to claim 5, wherein the power supply cut-off available area comprises a register that holds the instruction signal to be output to the instruction signal hold latch.

7. The microcomputer according to claim 1, wherein the line is not disposed in the cut cell that is disposed so as to correspond to a boundary between the power supply cut-off available areas.

8. The microcomputer according to claim 1, further comprising a VDD buffer that receives supply of electric power from the IO power supply system and supplies electric power to at least one of the IO buffer and the cut cell.

9. The microcomputer according to claim 1, further comprising a corner cell disposed at four corners of a chip of the microcomputer.

* * * * *